United States Patent
Hiramatsu et al.

(10) Patent No.: US 12,269,249 B2
(45) Date of Patent: Apr. 8, 2025

(54) PHENOLIC RESIN FOAM LAMINATE BOARD AND COMPOSITE BOARD

(71) Applicant: Asahi Kasei Construction Materials Corporation, Tokyo (JP)

(72) Inventors: Nobuki Hiramatsu, Tokyo (JP); Hisashi Mihori, Tokyo (JP); Takayuki Kuroda, Tokyo (JP)

(73) Assignee: Asahi Kasei Construction Materials Corporation, Tokyo (JP)

( * ) Notice: Subject to any disclaimer, the term of this patent is extended or adjusted under 35 U.S.C. 154(b) by 368 days.

(21) Appl. No.: 17/758,897

(22) PCT Filed: Jan. 15, 2021

(86) PCT No.: PCT/JP2021/001213
§ 371 (c)(1),
(2) Date: Jan. 25, 2023

(87) PCT Pub. No.: WO2021/145417
PCT Pub. Date: Jul. 22, 2021

(65) Prior Publication Data
US 2023/0226801 A1   Jul. 20, 2023

(30) Foreign Application Priority Data
Jan. 16, 2020 (JP) ................. 2020-005370

(51) Int. Cl.
*B32B 5/20* (2006.01)
*B32B 5/02* (2006.01)
(Continued)

(52) U.S. Cl.
CPC ............. *B32B 5/20* (2013.01); *B32B 5/022* (2013.01); *B32B 5/245* (2013.01); *C08G 8/10* (2013.01);
(Continued)

(58) Field of Classification Search
None
See application file for complete search history.

(56) References Cited

U.S. PATENT DOCUMENTS

| 4,595,710 A | 6/1986 | Albertelli et al. |
| 8,268,737 B1 * | 9/2012 | Kumar ............... B32B 5/18 428/920 |

(Continued)

FOREIGN PATENT DOCUMENTS

| CN | 102300927 A | 12/2011 |
| CN | 103319677 A | 9/2013 |

(Continued)

OTHER PUBLICATIONS

Teranishi, K., Phenol Resin Foam, Jun. 21, 2018, machine translation of JP2018-095825 (Year: 2018).*

(Continued)

*Primary Examiner* — Chinessa T. Golden
(74) *Attorney, Agent, or Firm* — KENJA IP LAW PC (57) ABSTRACT

In the phenolic resin foam laminate board (10), a surface material (2) is arranged on at least one of one side of a phenolic resin foam (1) and the back side of the one side. The phenolic resin foam (1) has a density of not less than 22 kg/m³ and not more than 50 kg/m³, a cell diameter of not less than 50 μm and not more than 170 μm, and a closed cell ratio of not less than 80%. When HCFO-1224yd(Z), aliphatic hydrocarbons having a carbon number of 6 or less, chlorinated saturated hydrocarbons having a carbon number of 5 or less, and hydrofluoroolefin are gas components, the phenolic resin foam contains only HCFO-1224yd (Z) as a gas component. A cell internal pressure of air bubble is 0.20 atm or more.

16 Claims, 1 Drawing Sheet

(51) Int. Cl.
*B32B 5/24* (2006.01)
*C08G 8/10* (2006.01)
*C08J 9/14* (2006.01)
*C08G 101/00* (2006.01)

(52) U.S. Cl.
CPC .............. *C08J 9/141* (2013.01); *C08J 9/144* (2013.01); *C08J 9/146* (2013.01); *C08J 9/149* (2013.01); *B32B 2250/03* (2013.01); *B32B 2250/40* (2013.01); *B32B 2262/0276* (2013.01); *B32B 2266/0285* (2013.01); *B32B 2266/08* (2013.01); *B32B 2266/104* (2016.11); *B32B 2305/022* (2013.01); *B32B 2307/304* (2013.01); *B32B 2307/3065* (2013.01); *B32B 2419/00* (2013.01); *C08G 2101/00* (2013.01); *C08G 2110/005* (2021.01); *C08G 2330/00* (2013.01); *C08J 2203/14* (2013.01); *C08J 2203/142* (2013.01); *C08J 2203/162* (2013.01); *C08J 2203/182* (2013.01); *C08J 2203/202* (2013.01); *C08J 2205/052* (2013.01); *C08J 2361/10* (2013.01)

(56) References Cited

U.S. PATENT DOCUMENTS

| | | | |
|---|---|---|---|
| 2012/0016047 A1 | 1/2012 | Takahashi | |
| 2012/0056346 A1* | 3/2012 | Maurer | B29C 69/001 264/48 |
| 2012/0270026 A1* | 10/2012 | Mihori | B29C 44/24 428/220 |
| 2013/0011655 A1* | 1/2013 | Hamajima | B32B 5/20 427/444 |
| 2013/0292599 A1 | 11/2013 | Robin | |
| 2014/0305667 A1 | 10/2014 | Robin | |
| 2016/0208067 A1 | 7/2016 | Kikuchi et al. | |
| 2016/0262490 A1 | 9/2016 | Yu et al. | |
| 2016/0326331 A1 | 11/2016 | Hamajima et al. | |
| 2017/0009037 A1 | 1/2017 | Hamajima et al. | |
| 2018/0230283 A1 | 8/2018 | Ihara et al. | |
| 2018/0264303 A1 | 9/2018 | Robin et al. | |
| 2018/0354238 A1 | 12/2018 | Abrgall et al. | |
| 2019/0218358 A1 | 7/2019 | Creazzo et al. | |
| 2020/0224822 A1 | 7/2020 | Chinsoga et al. | |

FOREIGN PATENT DOCUMENTS

| | | | |
|---|---|---|---|
| CN | 103890065 A | 6/2014 | |
| CN | 105482357 A | 4/2016 | |
| CN | 105849166 A | 8/2016 | |
| EP | 1275687 A2 | 1/2003 | |
| EP | 2957616 A1 | 12/2015 | |
| EP | 2768893 B1 | 4/2016 | |
| EP | 3677624 A1 | 7/2020 | |
| EP | 3992220 A1 | 5/2022 | |
| JP | S5543189 A | 3/1980 | |
| JP | H02150310 A | 6/1990 | |
| JP | 2003183439 A | 7/2003 | |
| JP | 2003213031 A | 7/2003 | |
| JP | 2004099867 A | 4/2004 | |
| JP | 2004176008 A | 6/2004 | |
| JP | 2014504675 A | 2/2014 | |
| JP | 2014530939 A | 11/2014 | |
| JP | 2015105343 A | 6/2015 | |
| JP | 6145209 B1 | 6/2017 | |
| JP | 6163601 B1 | 7/2017 | |
| JP | 2017128126 A | 7/2017 | |
| JP | 2018095707 A | 6/2018 | |
| JP | 2018095825 A * | 6/2018 | |
| JP | 2018095869 A | 6/2018 | |
| JP | 2018123292 A | 8/2018 | |
| JP | 2019031636 A | 2/2019 | |
| JP | 2019044035 A | 3/2019 | |
| JP | 2019089292 A | 6/2019 | |
| JP | 2019209543 A | 12/2019 | |
| KR | 1020190132628 A | 11/2019 | |
| TW | 201641582 A | 12/2016 | |
| TW | 201706133 A | 2/2017 | |
| WO | 2015111670 A1 | 7/2015 | |
| WO | 2016152155 A1 | 9/2016 | |
| WO | 2017192550 A1 | 11/2017 | |
| WO | 2018117224 A1 | 6/2018 | |
| WO | WO-2019036049 A1 * | 2/2019 | ........... A62D 1/0057 |
| WO | 2019044298 A1 | 3/2019 | |
| WO | 2019075040 A1 | 4/2019 | |
| WO | 2019078062 A1 | 4/2019 | |
| WO | 2021002097 A1 | 1/2021 | |

OTHER PUBLICATIONS

Jul. 19, 2022, International Preliminary Report on Patentability issued in the International Patent Application No. PCT/JP2021/001213.

Mar. 23, 2021, International Search Report issued in the International Patent Application No. PCT/JP2021/001213.

Liu Xizong et al., Research and Application of Hollow Phenolic Microspheres, Apr. 2010.

Apr. 21, 2023, the Supplementary European Search Report issued by the European Patent Office in the corresponding European Patent Application No. 21740849.1.

Simo Ilomets et al., Impact of Linear Thermal Bridges on Thermal Transmittance of Renovated Apartment Buildings, Journal of Civil Engineering and Management, Jun. 13, 2016.

* cited by examiner

PHENOLIC RESIN FOAM LAMINATE BOARD AND COMPOSITE BOARD

CROSS-REFERENCE TO RELATED APPLICATIONS

This application claims priority to Japanese Patent Application No. 2020-005370 filed in Japan on Jan. 16, 2020, the entire disclosure of which is incorporated herein by reference.

TECHNICAL FIELD

The present disclosure relates to a phenolic resin foam laminate board.

BACKGROUND

Phenolic resin foam has high heat insulation properties, flame retardancy, and heat resistance among foamed plastic heat insulating materials, and in particular, for the purpose of providing ease of handling during installation, phenolic resin foam laminate boards with a surface material directly laminated on the surface are known.

The recent increase in demand for insultation in buildings has led to a need for phenolic resin foam laminate boards with even higher thermal insultation, and there is a need for technology to apply HCFO-1224yd (Z) (chemical name: (Z)-1-Chloro-2,3,3,3-Tetrafluoropropene), which has particularly low thermal conductivity as a blowing agent, to phenolic resin foam laminate boards.

Patent Literature (PTL) 1 discloses that a combination of HCFO-1224yd (Z) and other blowing agents can be used for the phenolic resin foam.

Patent Literature (PTL) 2 discloses that the thermal conductivity can be reduced by using HCFO-1224yd (Z) in a urethane foam of the same thermosetting resin.

CITATION LIST

Patent Literature

PTL 1: WO2019/036049 (A1)
PTL 2: JP2015105343 (A)

SUMMARY

Technical Problem

However, HCFO-1224yd (Z) has relatively low solubility in resol-type phenolic resins among many hydrofluoroolefins, and further, has larger volume per substance amount compared to blowing agents such as 2-chloropropane and cyclopentane. Therefore, HCFO-1224yd (Z) is difficult to be dispersed in the resol-type phenolic resin.

When a required molar amount of HCFO-1224yd (Z) is dispersed in a resol-type phenolic resin, it takes time to disperse, and in addition, it has to be ejected, as a foaming phenolic resin composition, onto the surface material in a state where the dispersion is insufficient. Furthermore, since HCFO-1224yd (Z) has a lower boiling point than HCFO-1233zd (E) and HFO-1336mzz (Z), if dispersion remains insufficient, HCFO-1224yd (Z) will easily dissipate before the resol-type phenolic resin cures. It was found that, since the content of HCFO-1224yd (Z) in the phenolic resin was decreased as a result, it was difficult to obtain a sufficient cell internal pressure when the foaming ratio was increased.

Therefore, when HCFO-1224yd (Z) is applied to the phenolic resin, the internal pressure against the curing shrinkage during the manufacturing step cannot be obtained, and the phenolic resin foam portion is more likely to shrink than the surface material laminated on the surface. As a result, there is a problem specific to HCFO-1224yd (Z) that wrinkles are likely to occur on the surface material, and it is difficult to obtain sufficient smoothness as a phenolic resin foam laminate board.

When wrinkles occur on the surface material, the smoothness on the surface material of the phenolic resin foam laminate board is impaired, and the workability is deteriorated. Therefore, in the phenolic resin foam laminate board to which HCFO-1224yd (Z) is applied, both high thermal insulation and wrinkle suppression are required.

The inventors have found a way to have HCFO-1224yd (Z) present at a high pressure in the bubbles of the phenolic resin foam laminate board, that is, a way to disperse HCFO-1224yd (Z), which has a large volume per amount of substance, in phenolic resin in a target amount and more uniformly, and have solved the above-mentioned problem.

Solution to Problem

Specifically, the present disclosure provides the following.

[1]

A phenolic resin foam laminate board in which a surface material is arranged on at least one of one side of a phenolic resin foam and a back side of the one side, wherein: the phenolic resin foam has a density of not less than 22 $kg/m^3$ and not more than 50 $kg/m^3$, a cell diameter of not less than 50 µm and not more than 170 µm, and a closed cell ratio of not less than 80%; when HCFO-1224yd (Z), aliphatic hydrocarbons having a carbon number of 6 or less, chlorinated saturated hydrocarbons having a carbon number of 5 or less, and hydrofluoroolefin are gas components, only HCFO-1224yd (Z) is contained as the gas components; and a cell internal pressure of air bubble is 0.20 atm or more.

[2]

A phenolic resin foam laminate board in which a surface material is arranged on at least one of one side of a phenolic resin foam and a back side of the one side, wherein: the phenolic resin foam has a density of not less than 22 $kg/m^3$ and not more than 50 $kg/m^3$, a cell diameter of not less than 50 µm and not more than 170 µm, and a closed cell ratio of 80% or more and contains at least one gas component selected from HCFO-1224yd (Z), aliphatic hydrocarbons having a carbon number of 6 or less, chlorinated saturated hydrocarbons having a carbon number of 5 or less, and hydrofluoroolefin; 20 mass % or more of the total amount of the gas component is HCFO-1224yd (Z); and a cell internal pressure of air bubble is 0.20 atm or more.

[3]

The phenolic resin foam laminate board according to [1] or [2], wherein the cell internal pressure is 0.26 atm or more.

[4]

The phenolic resin foam laminate board according to any one of [1] to [3], wherein the compressive elastic modulus of a surface layer portion is 4.9 MPa or more.

[5]

The phenolic resin foam laminate board according to any one of [1] to [4], wherein the phenolic resin foam contains 3.0 vol % or less of air.

[6]

The phenolic resin foam laminate board according to any one of [1] to [5], wherein the thermal conductivity at 23° C. is 0.0180 W/(m·K) or less.

[7]

The phenolic resin foam laminate board according to any one of [1] to [5], wherein the thermal conductivity at 23° C. is 0.0159 W/(m·K) or less.

[8]

The phenolic resin foam laminate board according to any one of [1] to [7], wherein the thermal conductivity at 10° C. is 0.0164 W/(m·K) or less.

[9]

A composite board made by laminating the phenol resin foam laminate board according to any one of [1] to [8] and an external member.

Advantageous Effect

According to the present disclosure, a high-performance phenol resin foam laminate board having a high heat insulation performance, less wrinkles on the surface material, and good smoothness on the surface of the surface material can be provided.

DETAILED DESCRIPTION

The following provides a detailed description of an embodiment of the present disclosure (hereinafter, also referred to as the "present embodiment").

The phenolic resin foam laminate board of the present embodiment is a phenolic resin foam laminate board with surface material arranged on at least one of the upper and lower surfaces of the phenolic resin foam. The surface smoothness of the surface on which the surface material is arranged is 0.80 mm or less. The surface smoothness is preferably 0.70 mm or less, more preferably 0.50 mm or less, even more preferably 0.41 mm or less, particularly preferably 0.37 mm or less, and most preferably 0.33 mm or less. When the surface smoothness is 0.80 mm or less, the surface has less undulations and sufficient workability can be easily obtained.

Figure 1:
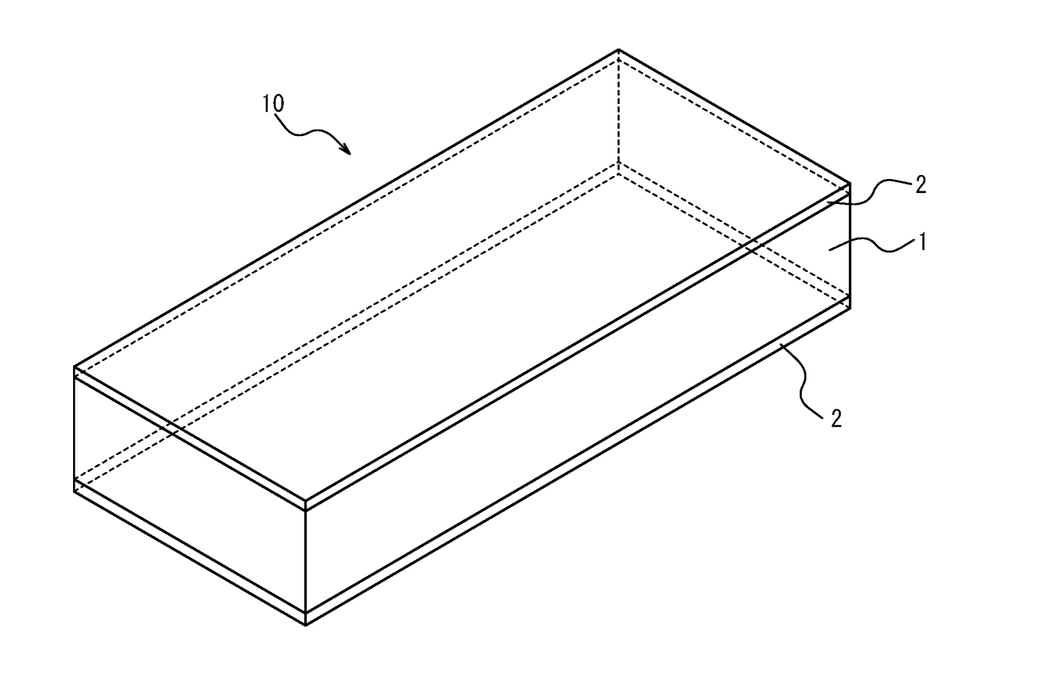
FIG. 1 is a perspective view of a phenolic resin foam laminate board according to the present embodiment.

FIG. 1 is a perspective view of the phenolic resin foam laminate board of the present embodiment. As illustrated in FIG. 1, the phenolic resin foam laminate board 10 includes a phenolic resin foam 1 and a flexible surface material 2. Although the flexible surface material 2 is attached to at least one of six sides of the plate-like phenolic resin foam 1 as a core material and a back side of the one side, it is generally attached to a main surface of the phenolic resin foam 1. The main surface is the widest surface. In the present embodiment, each flexible surface material 2 is attached to both main surfaces. Each flexible surface material 2 is often attached by impregnating the surface material 2 with a part of the resin constituting the phenolic resin foam 1.

The phenolic resin foam laminate board of the present embodiment is produced by adding a surfactant to a "phenolic resin" to obtain a "phenolic resin composition", further adding a blowing agent and a curing agent including an organic acid to obtain a "foamable phenolic resin composition" that has been provided with foamability and curability, loading the "foamable phenolic resin composition" into a mixer, ejecting the "foamable phenolic resin composition" from the mixer after mixing thereof onto the surface material, and then performing foaming and curing of the "foamable phenolic resin composition" under heating.

The phenolic resin is a resol-type phenolic resin obtained by heating phenols and aldehydes in a temperature range of 40° C. to 100° C. in the presence of an alkali metal hydroxide or an alkaline earth metal hydroxide to synthesize the phenolic resin. The molar ratio in which the phenols and the aldehydes are used is preferably within a range of 1:1 to 1:4.5, and more preferably within a range of 1:1.5 to 1:2.5.

Examples of phenols that can preferably be used in synthesis of the phenolic resin include resorcinol, catechol, o-, m-, and p-cresol, xylenols, ethylphenols, p-tert-butylphenol, and the like, in addition to phenol. Further, binuclear phenols can also be used.

Examples of aldehydes that can preferably be used in synthesis of the phenolic resin include glyoxal, acetaldehyde, chloral, furfural, benzaldehyde, and the like, in addition to formaldehyde, and derivatives of any of these aldehydes can also be used.

An additive such as urea, dicyandiamide, or melamine may be added to the resol-type phenolic resin during synthesis or after synthesis, as necessary. In a case in which urea is added, it is preferable that urea that has been methylolated in advance using an alkali catalyst is mixed with the resol-type phenolic resin.

Since the resol-type phenolic resin obtained after synthesis normally contains excess water, the resol-type phenolic resin is dehydrated to obtain a suitable viscosity for foaming.

The water content of the phenolic resin is preferably not less than 2.0 mass % and not more than 20 mass %, more preferably not less than 2.0 mass % and not more than 15 mass %, even more preferably not less than 2.0 mass % and not more than 9 mass %, particularly preferably not less than 3.0 mass % and not more than 8 mass %, and most preferably not less than 3.0 mass % and not more than 7 mass %. In order to obtain the water content of less than 2.0 mass % contained in the phenolic resin, since a large amount of energy and time is required during dehydration, 2.0 mass % or more is preferable from the viewpoint of productivity, and 20 mass % or less is preferable from the viewpoint of sufficient dispersion of HCFO-1224yd (Z).

Various types of additives such as an aliphatic hydrocarbon, a high-boiling point alicyclic hydrocarbon, or a mixture thereof, diluents for viscosity adjustment such as ethylene glycol or diethylene glycol, or a phthalic acid compound or the like, as necessary, can be added to the phenolic resin. The viscosity of the phenolic resin and the phenolic resin composition at 40° C. is preferably not less than 5,000 mPa·s and not more than 25,000 mPa·s.

Non-ionic surfactants are effective as the surfactant that is added to the phenolic resin and preferable examples thereof include an alkylene oxide that is a copolymer of ethylene oxide and propylene oxide, a condensate of an alkylene oxide and castor oil, a condensation product of an alkylene oxide and an alkylphenol such as nonylphenol or dodecylphenol, a polyoxyethylene alkyl ether in which the alkyl ether part has a carbon number of 14 to 22, a fatty acid ester such as a polyoxyethylene fatty acid ester, a silicone compound such as polydimethylsiloxane, a block copolymer of dimethylpolysiloxane and polyether, and a polyalcohol. These surfactants may be used alone or as a combination of two or more types.

The amount of the surfactant that is used per 100 parts by mass of the phenolic resin is preferably not less than 0.3 parts by mass to not more than 10 parts by mass.

The phenolic resin composition is preferably stored for 1 hour or more in a reduced pressure environment of 15 to 40° C. and 25 to 50 kPa abs, more preferably 2 hours or more, in the step immediately before mixing with the blowing agent. Within the above-described range, defoaming can be performed while avoiding boiling of water, and air mixed in when the phenol resin is stirred can be removed. As a result, the amount of the air contained in the bubbles can be reduced, and the thermal conductivity can be reduced.

It is preferable to mix the surfactant mixed with the blowing agent into the phenolic resin composition separately from the surfactant that is directly mixed with the phenolic resin.

The surfactant to be mixed with the blowing agent preferably has an HLB of 14 or less. Further, the amount added is preferably 70 mass % or less of the surfactant to be directly mixed with the phenolic resin, and preferably 1 part or more with respect to 100 parts by mass of the blowing agent. Within the above-described range, phase-transfer emulsification from a W/O emulsion to an O/W emulsion facilitates obtaining a fine and uniform dispersion state, and as a result, diffusion of HCFO-1224yd (Z) is suppressed and the internal pressure can be increased. Further, since voids caused by coagulation of the blowing agent are suppressed, the compressive elastic modulus of the surface layer portion of the phenolic resin foam produced later can be increased.

The phenolic resin foam of the present embodiment contains a blowing agent, wherein 20 mass % or more of the blowing agent is HCFO-1224yd (Z), preferably 40 mass % or more, more preferably 50 mass % or more, even more preferably 64 mass % or more, and most preferably 72 mass % or more of the blowing agent is HCFO-1224yd (Z).

Since HCFO-1224yd (Z) has a low thermal conductivity among HCFOs, the component ratio of HCFO-1224yd (Z) in the blowing agent affects the heat insulation performance. Further, since HCFO-1224yd (Z) has low solubility in phenolic resin among HCFOs, the hydrophobicity of the foam is increased, and a decrease in the reaction rate of resin due to water is unlikely to occur. Therefore, when 20 mass % or more of the blowing agent is HCFO-1224yd (Z), the heat insulation performance is improved, and the compressive elasticity modulus of the surface layer portion is improved.

In addition, as a blowing agent, HCFO-1224yd (Z) can be combined with other hydrofluoroolefins, hydrocarbons, and chlorinated hydrocarbons.

The hydrocarbon is preferably a cyclic or chain alkane, alkene, or alkyne having a carbon number of 3 to 7, and specific examples thereof include normal butane, isobutane, cyclobutane, normal pentane, isopentane, cyclopentane, neopentane, normal hexane, isohexane, 2,2-dimethylbutane, 2,3-dimethylbutane, cyclohexane, or the like. Of these hydrocarbons, the pentanes such as normal pentane, isopentane, cyclopentane, and neopentane, and the butanes such as normal butane, isobutane, and cyclobutane can suitably be used.

Other hydrofluoroolefins include chlorinated hydrofluoroolefins and non-chlorinated hydrofluoroolefins Examples of chlorinated hydrofluoroolefins include 1-chloro-3,3,3-trifluoropropene (HCFO-1233zd, for example, HCFO-1233zd (E), which is, Solstice® (Solstice is a registered trademark in Japan, other countries, or both) LBA (product name) from Honeywell Japan Ltd.), 1,1,2-trichloro 3,3,3-trifluoropropene (HCFO-1213xa), 1,2-dichloro 3,3,3-trifluoropropene (HCFO-1223xd), 1,1-dichloro-3,3,3-trifluoropropene (HCFO-1223za), 1-chloro 1,3,3,3-tetrafluoropropene (HCFO-1224zb), 2,3,3-trichloro-3-fluoropropene (HCFO-1231xf), 2,3-dichloro 3,3-di fluoropropene (HCFO-1232xf), 2-chloro-1,1,3-trifluoropropene (HCFO-1233xc), 2-chloro-1,3,3,3-trifluoropropene (HCFO-1233xe), 2-chloro-3,3,3-trifluoropropene (HCFO-1233xf), 1-chloro-1,2,3-trifluoropropene (HCFO-1233yb), 3-chloro-1,1,3-trifluoropropene (HCFO-1233yc), 1-chloro-2,3,3-trifluoropropene (HCFO-1233yd), 3-chloro-1,2,3-trifluoropropene (HCFO-1233ye), 3-chloro 2,3,3-trifluoropropene (HCFO-1233yf), 1-chloro-1,3,3-trifluoropropene (HCFO-1233zb), 1-chloro-3,3,3-trifluoropropene (HCFO-1233zd), or the like, and configurational isomers thereof, that is, one of or mixture of E and Z is used. In addition, (E)-1-chloro-2,3,3,3-tetrafluoropropene (HCFO-1224yd (E)) is included.

Examples of non-chlorinated hydrofluoroolefins include 1,3,3,3-tetrafluoroprop-1-ene (HFO-1234ze, for example, HFO-1234ze (E), which is, product name: Solstice® (Solstice is a registered trademark in Japan, other countries, or both) from Honeywell Japan Ltd.), 1,1,1,4,4,4-hexafluoro-2-butene (HFO-1336mzz, for example, HFO-1336mzz (Z), which is, Opteon™ 1100 from Chemours Company), 2,3,3,3-tetrafluoro-1-propene (HFO-1234yf), 1,1,3,3,3-pentafluoropropene (HFO-1225zc), 1,3,3,3-tetrafluoropropene (HFO-1234ze), 3,3,3-trifluoropropene (HFO-1243zf), 1,1,1,4,4,5,5,5-octafluoro-2-pentene (HFO-1438mzz), or the like, and configurational isomers thereof, that is, one of or mixture of E and Z is used.

Linear or branched chlorinated aliphatic hydrocarbons having a carbon number of 2 to 5 can preferably be used as the chlorinated hydrocarbon. The number of bonded chlorine atoms is preferably 1 to 4. For example, dichloroethane, propyl chloride, 2-chloropropane, butyl chloride, isobutyl chloride, pentyl chloride, isopentyl chloride, or the like is preferable. Of these chlorinated hydrocarbons, propyl chloride and 2-chloropropane, which are chloropropanes, are more preferably used.

Note that HCFO-1224yd (Z) may be used alone or as a combination of one or more types of the above-mentioned blowing agent. The blowing agent to be combined with HCFO-1224yd (Z) is preferably HCFO-1233zd (E), cyclopentane, isopentane, and 2-chloropropane, more preferably cyclopentane or isopentane, and even more preferably cyclopentane. These blowing agents have a higher boiling point than HCFO-1224yd (Z) and are less likely to affect the dispersion state of HCFO-1224yd (Z) than other blowing agents. Thus they tend to suppress decrease in the internal pressure when HCFO-1224yd (Z) is used.

The other phenolic resin foam of the present embodiment contains only HCFO-1224yd (Z) as a gas component, when HCFO-1224yd (Z), an aliphatic hydrocarbon having a carbon number of 6 or less, a chlorinated saturated hydrocarbon having a carbon number of 5 or less and hydrofluoroolefin are the gas component.

Here, the gas component is HCFO-1224yd (Z), aliphatic hydrocarbons having a carbon number of 6 or less, chlorinated saturated hydrocarbons having a carbon number of 5 or less, and hydrofluoroolefins analyzed by GC/MS with respect to the phenolic resin foam.

When the HCFO-1224yd (Z) is mixed with the phenol resin composition, it is preferably mixed under pressure and pre-kneaded at 30 to 55° C. before mixing with the curing catalyst. When mixed with under pressure, HCFO-1224yd (Z) can be dispersed as a liquid even if the temperature is raised.

When kneaded at 30° C. or higher, the solubility of HCFO-1224yd (Z) in the phenolic resin can be increased, and the viscosity as the phenol resin composition can be decreased. As a result, a dispersed state can be formed in advance before mixing with the curing catalyst, scattering of HCFO-1224yd (Z) can be suppressed, and the internal pressure can be easily increased. In contrast, the temperature exceeding 55° C. makes it difficult to cool when mixed with the curing catalyst, and HCFO-1224yd (Z) is scattered, which tends to cause a decrease in an internal pressure.

In the present embodiment, a foam nucleating agent may be used in production of the phenolic resin foam laminate board. A gaseous foam nucleating agent such as a low-boiling point substance (for example, nitrogen, helium, argon, or the like) having a boiling point of at least 50° C. lower than the blowing agent can be added as the foam nucleating agent. Moreover, a solid foam nucleating agent such as an inorganic powder (for example, aluminum hydroxide powder, aluminum oxide powder, calcium carbonate powder, talc, kaolin, silica stone powder, silica sand, mica, calcium silicate powder, wollastonite, glass powder, glass beads, fly ash, silica fume, gypsum powder, borax, slag powder, alumina cement, or Portland cement) or an organic powder (for example, pulverized powder of a phenolic resin foam) can be added. These foam nucleating agents may be used alone or as a combination of two or more types without distinction between gases and solids. The timing at which the foam nucleating agent is added can be freely set as long as the foam nucleating agent is supplied into a mixer in which the foamable phenolic resin composition is mixed.

The additive amount of a gaseous foam nucleating agent relative to the blowing agent is preferably not less than 0.1 mass % and not more than 1.0 mass %, and more preferably not less than 0.1 mass % and not more than 0.5 mass % when the amount of the blowing agent is taken to be 100 mass %. Further, the additive amount of a solid foam nucleating agent per 100 parts by mass, in total, of the phenolic resin and the surfactant is preferably not less than 3.0 parts by mass and not more than 10.0 parts by mass, and more preferably not less than 4.0 parts by mass and not more than 8.0 parts by mass.

The curing catalyst that is added to the phenolic resin composition is preferably a curing catalyst that includes an organic acid as an acid component. The organic acid is preferably an aryl sulfonic acid or an anhydride thereof. Examples of aryl sulfonic acids and anhydrides thereof include toluene sulfonic acid, xylene sulfonic acid, phenol sulfonic acid, substituted phenol sulfonic acid, xylenol sulfonic acid, substituted xylenol sulfonic acid, dodecylbenzene sulfonic acid, benzene sulfonic acid, naphthalene sulfonic acid, etc., and anhydrides of any of the preceding examples. These organic acids may be used alone, or a combination of two or more of these organic acids may be used. Note that, in the present embodiment, resorcinol, cresol, saligenin (o-methylolphenol), p-methylolphenol, or the like, may be added as a curing aid. Moreover, these curing agents may be diluted with a solvent such as ethylene glycol or diethylene glycol.

The amount of the curing catalyst that is used differs depending on the type of the curing catalyst. When a mixture of 60 mass % of paratoluenesulfonic acid monohydrate and 40 mass % of diethylene glycol is used, it is used preferably in an amount of not less than 8 parts by mass and not more than 20 parts by mass, and more preferably in an amount of not less than 10 parts by mass and not more than 15 parts by mass with respect to 100 parts by mass of the total of phenolic resin and surfactant.

Note that the surfactant and blowing agent that are contained in the foamable phenolic resin composition may be added to the phenolic resin in advance or may be added to the phenolic resin at the same time as the curing catalyst.

In the phenolic resin foam of the present embodiment, the cell internal pressure of the blowing agent component is 0.20 atm (20.3 kPa) or more, preferably 0.23 atm (23.3 kPa) or more, more preferably 0.26 atm (26.3 kPa) or more, even more preferably 0.30 atm (30.4 kPa) or more, and most preferably 0.35 atm (35.5 kPa) or more. Note that the cell internal pressure is an internal pressure of bubbles of the phenolic resin foam. The cell internal pressure of the blowing agent component acts on the shrinkage force inside the foam and the gas ratio to nitrogen and oxygen mixed in the bubbles. The phenolic resin foam laminate board is heated and cured to increase the strength of the product, but during curing, softening of the resin due to high temperature and shrinkage due to curing occur simultaneously, so if the cell internal pressure is low, the phenolic resin foam shrinks and wrinkles are likely to occur on the surface material arranged on the surface. When the cell internal pressure of the blowing agent component is 0.20 atm (20.3 kPa) or more, the shrinkage force inside the foam is relaxed, the generation of wrinkles is suppressed, and the surface smoothness is improved. Furthermore, since the abundance ratio of mixed oxygen and nitrogen is reduced, the heat insulating performance is improved.

In order to increase the cell internal pressure of the blowing agent component, an increase in the volume of the blowing agent due to temperature rise is suppressed, and instead the amount of the blowing agent substance remaining in the bubbles is increased to obtain a desired foam density. Specifically, the cell internal pressure of the blowing agent component can be increased first, by suppressing diffusion of blowing agent to increase the residual rate of the blowing agent while adding a large amount of blowing agent, and second, by decreasing the temperature of the foamable phenolic resin composition to suppress the vapor pressure per substance amount of the blowing agent.

As a method of suppressing diffusion of the blowing agent, the blowing agent may be uniformly dispersed in the phenolic resin composition. In particular, in order to uniformly disperse HCFO-1224yd (Z), the foaming phenolic resin composition is stirred at a two-step temperature, that is, the blowing agent and the surfactant are pre-kneaded and then added to the phenolic resin composition.

As a method of decreasing the temperature of the foaming phenolic resin composition, either one of the following methods may be used: a method of decreasing the temperature of the main molding step, which is a main step of foaming and curing reactions; a method of decreasing the reaction heat of phenolic resin per hour by increasing the residence time to the step of premolding while foaming and curing the foamable phenolic resin composition ejected on the surface material by covering it with the surface material from above; a method of decreasing the amount of added organic acid used as a curing catalyst; and a method of increasing the molecular weight of phenolic resin to reduce the heat of reaction.

In the phenolic resin foam of the present embodiment, the amount of air contained in the bubbles is preferably 3.0 vol % or less, more preferably 2.2 vol % or less, even more preferably 1.5 vol % or less, and most preferably 0.9 vol % or less. Examples of the method of reducing the amount of air include a method in which the phenolic resin composition is stored in a tank under reduced pressure and defoamed. Air is mixed in when the phenolic resin is fed and stirred, and is present inside as small bubbles due to high viscosity of the phenolic resin. Air tends to be the starting point of voids and has a higher thermal conductivity than blowing agents, which may deteriorate the heat insulation performance. When the amount of air is 3.0 vol % or less, the amount of air with respect to the abundance ratio of the blowing agent is decreased, and as a result, an excellent heat insulating performance can be easily obtained.

The density of the phenolic resin foam of the present embodiment is not less than 22 kg/m$^3$ and not more than 50 kg/m$^3$, preferably not less than 22 kg/m$^3$ and not more than 41 kg/m$^3$, and more preferably not less than 22 kg/m$^3$ and not more than 34 kg/m$^3$. When the density is 22 kg/m$^3$ or more, mechanical strength such as compressive strength and bending strength can be ensured, and damage during handling of the foam can be avoided. Further, when the density is 22 kg/m$^3$ or more, the compressive elastic modulus of the surface layer portion is likely to be increased. In contrast, when the density is 50 kg/m$^3$ or less, the heat transfer of the resin portion is unlikely to increase, and thus the heat insulation performance can be maintained.

The density can be adjusted to a desired value through altering the proportion of the blowing agent, the temperature of the foamable phenolic resin composition, the timing of pre-molding in a step of ejecting the mixed foamable phenolic resin composition onto a lower surface material, the ratio between the additive amount of the blowing agent and the additive amount of organic acid, and curing conditions such as temperature and residence time, or the like.

The average cell diameter of the phenolic resin foam of the present embodiment is not less than 50 µm and not more than 170 µm, preferably not less than 50 µm and not more than 150 µm, more preferably not less than 50 µm and not more than 130 µm, even more preferably not less than 50 µm and not more than 110 µm, and most preferably not less than 50 µm and not more than 100 µm. When the average cell diameter is 50 µm or more, the bubble wall is prevented from being too thin, and deterioration of the strength due to deformation can be suppressed. Further, when the average cell diameter is within 170 µm, thermal conduction due to radiation can be suppressed. The average cell diameter can be adjusted to a desired value through adjustment of the reactivity and temperature of the phenolic resin and also through alteration of the additive amount of the foam nucleating agent, the ratio of the additive amount of the blowing agent and the additive amount of the organic acid used as the curing catalyst, further the curing temperature conditions, or the like.

The closed cell ratio of the phenolic resin foam of the present embodiment is 80% or more, preferably 90% or more, and more preferably 95% or more. When the closed cell ratio is 80% or more, a decrease in thermal insulation performance due to diffusion of the blowing agent in the phenolic resin foam caused by an increased pressure under high temperature environment during production can be easily suppressed.

Note that the closed cell ratio of the phenolic resin foam can be adjusted to a desired value through adjustment of the reactivity and the temperature of the phenolic resin and also through alteration of the ratio of the additive amount of the blowing agent and the additive amount of the organic acid used as the curing catalyst, and further the curing conditions.

In the phenolic resin foam of the present embodiment, the compressive elasticity modulus of the surface layer portion is preferably 4.9 MPa or more, more preferably 5.2 MPa or more, even more preferably 5.5 MPa or more, particularly preferably 5.8 MPa or more, and most preferably 6.0 MPa or more. Since the surface layer portion has a skin layer having a high resin density, the amount of curing shrinkage tends to be smaller than that of the inner layer. Therefore, regarding the progress of curing of the surface layer portion, there is an advantage that the shrinkage on the surface caused by curing can be suppressed by the shrinkage force of the inner layer, which is greater than the shrinkage due to curing. In addition, the surface layer portion is a portion that directly contacts the surface material, and thus a portion that determines the final surface smoothness. Therefore, when the compressive elasticity modulus of the surface layer portion is 4.9 MPa or more, generation of wrinkles on the surface material due to shrinkage of the foam is suppressed, and the surface smoothness is improved.

The compressive elasticity modulus of the surface layer portion increases with the progress of curing and, for example, it can be increased by adding conditions for heating at the start of the post-curing step at a temperature higher than the temperature thereafter for not less than 5 minutes and not more than 40 minutes and for half or less of the time of the entire post-curing step. Further, the compressive elasticity modulus of the surface layer portion can be increased by suppressing diffusion of HCFO-1224yd (Z) component and densifying the bubble structure of the surface layer. Diffusion of the HCFO-1224yd (Z) component can be suppressed by uniformly dispersing the HCFO-1224yd(Z) to the phenolic resin composition.

The phenolic resin foam of the present embodiment has a thermal conductivity of preferably 0.0180 W/(m·K) or less at 23° C. The thermal conductivity is more preferably 0.0174 W/(m·K) or less, even more preferably 0.0164 W/(m·K) or less, and most preferably 0.0159 W/(m·K) or less.

The phenolic resin foam of the present embodiment has a thermal conductivity of preferably 0.0164 W/(m·K) or less at 10° C. The thermal conductivity is more preferably 0.0160 W/(m·K) or less, even more preferably 0.0157 W/(m·K) or less, and most preferably 0.0155 W/(m·K) or less.

The thermal conductivity can be adjusted, for example, by the composition of the phenolic resin, the amount of air contained, the viscosity, the type and ratio of the blowing agent, the ratio of the bubble nucleating agent, the curing conditions, the foaming conditions, and the like.

The phenolic resin foam laminate board of the present embodiment can be used alone, and in addition, can be used in various applications as a composite board laminated with an external member. Examples of external members include at least one of board materials and sheet/film materials and a combination thereof. Examples of suitable board materials include wooden boards such as normal plywood, structural plywood, particle board, and OSB, wood-wool cement board, wood chip cement board, gypsum board, flexible board, medium density fiberboard, calcium silicate board, magnesium silicate board, and volcanic silicates fiber reinforced multi-layer board. Examples of suitable sheet/film materials include polyester non-woven fabric, polypropylene non-woven fabric, inorganic filled glass fiber non-woven fabric, glass fiber non-woven fabric, paper, calcium carbonate paper, polyethylene-treated paper, polyethylene film, plastic moisture-proof film, asphalt waterproof paper, and aluminum foil (with or without holes).

Next, the production method of the phenolic resin foam laminate board set forth above is described in detail.

The production method of the phenolic resin foam laminate board may be a continuous production method that includes: a step of mixing a foamable phenolic resin composition that contains a phenolic resin, a surfactant, a blowing agent, and a curing catalyst containing an organic acid using a mixer; a step of ejecting the foamable phenolic resin composition that has been mixed onto a surface material; a step of carrying out pre-molding while covering the foamable phenolic resin composition that has been ejected onto the surface material with a surface material from above, and performing foaming and curing of the foamable phenolic resin composition; a step of performing a main molding that is a main step of performing foaming and a curing reaction; and a step of subsequently performing a post-curing that allows water in the phenolic resin composition to disperse.

The methods of pre-molding and main molding in the pre-molding step and the main molding step, respectively, of the continuous production process may be any of various methods depending on the production objectives, and examples thereof include a method using a slat-type double conveyor, a method using a metal roll or a steel board, and a method using a combination of a plurality of such methods. In a molding using a slat-type double conveyor, for example, the foamable phenolic resin composition that is covered by upper and lower surface materials is continuously guided into the slat-type double conveyor, pressure is subsequently applied from above and below under heating, and foaming and curing are performed while performing adjustment to a specific thickness to enable molding of a sheet shape.

The surface materials provided on at least upper and lower surfaces of the phenolic resin foam may be surface materials that display flexibility (flexible surface materials). Preferable examples of flexible surface materials that can be used include non-woven fabric and woven fabric containing polyester, polypropylene, nylon, or the like as a main component, paper such as kraft paper, glass fiber mixed paper, calcium hydroxide paper, aluminum hydroxide paper, or magnesium silicate paper, and non-woven fabric of inorganic fiber such as glass fiber non-woven fabric. Moreover, these surface materials may be mixed (or stacked) for use.

The heating temperature control conditions in the pre-molding step are as follows: the ambient temperature is lower than that in the main molding step by 4° C. to 12° C., and the residence time in the pre-molding step is 10 minutes or more. The reaction heat of the phenolic resin can be dispersed by heating under these conditions before the main molding step, and the temperature rise of the foamable phenolic resin composition can be suppressed during the main molding step. Thus the cell internal pressure of the blowing agent component can be increased. When the temperature is higher than the temperature which is lower than the temperature of the main molding step by 4° C., foaming progresses rapidly and the cell diameter is increased, as a result the thermal conductivity tends to deteriorate. When the temperature is lower than that of the main molding step by more than 12° C., or the residence time is less than 10 minutes, the reaction heat cannot be dispersed in terms of time, the temperature of the foamable phenolic resin composition rises too much in the main molding step, and the cell internal pressure of the blowing agent component is decreased. As a result, wrinkles are likely to occur on the surface and the surface smoothness tends to decrease.

The heating temperature control condition in the main molding step that follows the pre-molding step is preferably not lower than 60° C. and not higher than 80° C., and more preferably not lower than 60° C. and not higher than 75° C. In this step, the main molding can be performed using an endless steel belt-type double conveyor, a slat-type double conveyor, a roll, or the like.

The heating temperature of the main molding step acts on the temperature of the foamable phenolic resin composition, and when this temperature is high, the cell internal pressure of the blowing agent component tends to be low. When the heating temperature of the main molding step is 80° C. or less, the vapor pressure of the blowing agent and water is suppressed, and the cell internal pressure tends to increase. Further, when it is 60° C. or more, the curing of the phenolic resin is promoted, and thus diffusion of blowing agent tends to be suppressed.

The post-curing step is performed after the pre-molding step and the main molding step. In order to prevent the foam from bursting due to vapor inside the foam, the heating in the post-curing step is performed in two stages. It is preferable that, in the first stage, the foam is heated at not lower than 140° C. and not higher than 150° C. for not less than 5 minutes and not more than 40 minutes, and for no more than half the total post-curing step time. Further, in the second stage, it is preferable that the foam is heated at not lower than 90° C. and not high than 120° C. When the temperature in the second stage exceeds 120° C., as in the first stage, the water vapor inside the foam tends to cause the foam to burst, and when the temperature is lower than 90° C., the time required for proceeding reaction of the phenolic resin tends to be too long.

EXAMPLES

The following provides a more detailed description of the present disclosure through examples and comparative example, but the present disclosure is not limited thereto.

<Synthesis of Phenolic Resin A>

A reactor was charged with 3,500 kg of 52 mass % formaldehyde aqueous solution (52 mass % formalin) and 2,510 kg of 99 mass % phenol (containing water as an impurity), these materials were stirred by a propeller rotation-type stirrer, and the internal liquid temperature of the reactor was adjusted to 40° C. through a temperature controller. Next, 48 mass % sodium hydroxide aqueous solution was added until the pH reached 8.7, and then heating up to 85° C. was performed to carry out a reaction. At the stage at which the Ostwald viscosity of the reaction liquid reached 120 square millimeters per second (=120 mm$^2$/s; measurement value at 25° C.), the reaction liquid was cooled, and urea was added such that the urea content in the phenolic resin was 4.6 mass %. Thereafter, the reaction liquid was cooled to 30° C., and a 50 mass % aqueous solution of paratoluene sulfonic acid monohydrate was added until the pH reached 6.3. The resultant reaction liquid was then concentrated by a thin film evaporator, and the viscosity and the moisture percentage were measured by the following method. As a result, a phenolic resin having a viscosity of 11,500 mPa·s at 40° C. and a moisture percentage of 8.5% was obtained, which was provided as a phenolic resin A.

<Synthesis of Phenolic Resin B>

A reactor was charged with 3,500 kg of 52 mass % formaldehyde aqueous solution (52 mass % formalin) and 2,510 kg of 99 mass % phenol (containing water as an impurity), these materials were stirred by a propeller rotation-type stirrer, and the internal liquid temperature of the reactor was adjusted to 40° C. through a temperature controller. Next, 48 mass % sodium hydroxide aqueous solution was added until the pH reached 8.7, and then heating was performed to 85° C. to carry out a reaction. At the stage at which the Ostwald viscosity of the reaction liquid reached 80 square millimeters per second (=80 mm$^2$/s; measurement value at 25° C.), urea was added such that the urea content in the phenolic resin was 4.6 mass % while cooling the reaction liquid. Thereafter, the reaction liquid was cooled to 30° C., and a 50 mass % aqueous solution of paratoluene sulfonic acid monohydrate was added until the pH reached 6.3. The resultant reaction liquid was then concentrated by a thin film evaporator, and the viscosity and the moisture percentage were measured by the following method. As a result, a phenolic resin having a viscosity of 12,000 mPa·s at 40° C. and a moisture percentage of 6.9% was obtained, which was provided as a phenolic resin B.

<Moisture Percentage of Phenolic Resin>
Moisture Percentage of Phenolic Resin Material A phenolic resin material was dissolved within a range of 3 mass % to 7 mass % in dehydrated methanol (from Kanto Chemical Co., Inc.) for which water content had been measured, the water content of the phenolic resin material was determined by subtracting water in the dehydrated methanol from the water content of the solution. The moisture percentage of the phenolic resin material was calculated from the water content measured. Measurement was performed using a Karl Fischer moisture meter (MKC-510 from Kyoto Electronics Manufacturing Co., Ltd.). For measurement of the water content, HYDRANAL-Composite 5K from Sigma-Aldrich was used as Karl Fischer reagent and HAYASHI-Solvent CE dehydrating solvent (for ketones) from Hayashi Pure Chemical Industry was used for Karl Fischer titration. Further, AQUAMICRON standard water/methanol (2 mg water) from Mitsubishi Chemical Co. was used to measure the titer of Karl Fischer reagent. The water content was measured using Method 1 set in the apparatus, and the titer of the Karl Fischer reagent was determined using Method 5. The ratio of the 21 btainned water content to the mass of the phenol resin material was determined, and this was used as the moisture percentage of the phenol resin material.

<Measurement of Viscosity>

The viscosity of a phenolic resin was taken to be a measurement value obtained using a rotary viscometer (R-100 from Toki Sangyo Co., Ltd.; rotor part: 3°×R-14) after 3 minutes of stabilization at 40° C.

Example 1

<Production of Phenolic Resin Foam Laminate Board>

A phenolic resin composition was obtained by mixing ethylene oxide-propylene oxide block copolymer Pluronic® F-127 as a surfactant in a proportion of 2.0 parts by mass per 100 parts by mass of the phenolic resin A. As a blowing agent, 12.1 parts by mass of a mixture of 34 mass % HCFO 1224yd (Z), 62 mass % HCFO-1233 zd (E) and 4 mass % isobutane was added to the 100 parts by mass of phenolic resin, then the first stage stirring was performed under 7 bar and 40° C. environment, which was then kept at 7 bar or more and fed into a rotation speed variable mixing head whose temperature was controlled to 15° C.

Thereafter, 14 parts by mass of composition of a mixture of 80 mass % xylene sulfonic acid and 20 mass % diethylene glycol as a curing catalyst per 100 parts by mass of phenolic resin composition (that is, the amount obtained by subtracting the blowing agent from the mixture is determined as 100 parts by mass) was fed into the mixing head for the second stage stirring with a mixer. The rotation speed of the mixing head was set to 450 rpm. The resultant foamable phenolic resin composition was distributed by a multiport distribution pipe and was fed onto a moving lower surface material. Note that a mixer disclosed in JP H10-225993 A was used as the mixing device (mixer). Specifically, the used mixer included a feeding port for the phenolic resin composition and the blowing agent containing the foam nucleating agent in an upper side surface of the mixer and included a feeding port for the curing catalyst in a side surface in proximity to the center of a stirring part where stirring was performed by a rotor. Downstream of the stirring part was connected to nozzles for ejection of the foamable phenolic resin composition. Moreover, the mixer comprised a part up to the curing catalyst feeding port as a mixing part (preceding stage), a part from the curing agent feeding port up to a part where stirring ends as a mixing part (subsequent stage), and a part from the part where stirring ends up to the nozzles as a distribution part. The distribution part included a plurality of nozzles at the end thereof and was designed such that the foamable phenolic resin composition that had been mixed was uniformly distributed. The temperatures of the mixer and the nozzles were adjusted using temperature control water, and the temperature of each temperature control water was 25° C. Moreover, a thermocouple was installed at an ejection port of the multiport distribution pipe to enable detection of the temperature of the foamable phenolic resin composition, and the foamable phenolic resin composition that was ejected onto the surface material had a temperature of 45° C. The foamable phenolic resin composition that had been supplied onto the surface material was introduced into a pre-molding step, and the equipment temperature in this pre-molding step was set to 74° C. The residence time of this step was 11 minutes. Note that the pre-molding was performed by a free roller from above the upper surface material.

Thereafter, the foamable phenolic resin composition was fed into a slat-type double conveyor with space temperature heated to 79° C. with the foamable phenolic resin composition sandwiched between two surface materials (main molding step). In the main molding step, curing was performed with a residence time of 11 minutes, and then the composition was cut in a direction vertical to the traveling direction to obtain 1820 mm long phenolic resin foam board intermediate. Thereafter, the composition was heated for three hours with an oven at 110° C. (post-curing step) to obtain a phenolic resin foam board. Table 1 shows conditions of pre-molding, main-molding and post curing step. Note that polyester non-woven fabric (Asahi Kasei ELTAS E05060) having a weight per unit area of 60 g/m$^2$ was used for both the upper and lower surface materials.

TABLE 1

| | Pre-molding step temperature [° C.] | Pre-molding step residence time [min] | Main molding step temperature [° C.] | Post-curing step: First stage temperature [° C.] | Post-curing step: First stage time [min] | Post-curing step: Second stage temperature [° C.] | Post-curing step: Second stage time [min] |
|---|---|---|---|---|---|---|---|
| Example 1 | 74 | 11 | 79 | None | None | 110 | 180 |
| Example 2 | 74 | 11 | 79 | 140 | 10 | 110 | 180 |
| Example 3 | 74 | 11 | 79 | 140 | 10 | 110 | 180 |

TABLE 1-continued

|  | Pre-molding step temperature [° C.] | Pre-molding step residence time [min] | Main molding step temperature [° C.] | Post-curing step: First stage temperature [° C.] | Post-curing step: First stage time [min] | Post-curing step: Second stage temperature [° C.] | Post-curing step: Second stage time [min] |
|---|---|---|---|---|---|---|---|
| Example 4 | 74 | 11 | 79 | 140 | 10 | 110 | 180 |
| Example 5 | 74 | 11 | 79 | 140 | 10 | 110 | 180 |
| Example 6 | 74 | 11 | 79 | 140 | 10 | 110 | 180 |
| Example 7 | 74 | 11 | 79 | 140 | 10 | 110 | 180 |
| Example 8 | 74 | 11 | 79 | 140 | 10 | 110 | 180 |
| Example 9 | 74 | 11 | 79 | 140 | 10 | 110 | 180 |
| Example 10 | 69 | 12 | 74 | 140 | 10 | 110 | 180 |
| Example 11 | 69 | 12 | 74 | 140 | 10 | 110 | 180 |
| Example 12 | 62 | 12 | 70 | 140 | 10 | 110 | 180 |
| Example 13 | 74 | 11 | 79 | None | None | 110 | 180 |
| Comparative Example 1 | 63 | 3 | 79 | None | None | 110 | 180 |

The density, the average cell diameter, the closed cell ratio, the total thickness compressive elasticity modulus, the compressive elasticity modulus of the surface layer portion, the identification of blowing agent type and composition ratio, the cell internal pressure of the blowing agent component, the amount of air contained, the surface smoothness, the thermal conductivity (23° C.) and the thermal conductivity (10° C.) of the phenolic resin foam were measured by the method described below for the resultant phenolic resin foam. Table 2 shows the measurement results of the density, the average cell diameter, the closed cell ratio, the compressive elasticity modulus of foam, the compressive elasticity modulus of foam surface layer portion, the cell internal pressure of blowing agent component, the amount of air contained, the surface smoothness, the thermal conductivity (23° C.) and the thermal conductivity (10° C.). Table 3 shows identification of the type of blowing agent and the measurement results of composition ratio.

TABLE 2

|  | Cell internal pressure of blowing agnet component [atm] | Compressive elastic modulus of foam [MPa] | Compressive elastic modulus of foam surface layer [MPa] | Amount of air contained [vol %] | Density [kg/m$^3$] | Average cell diameter [μm] | Closed cell ratio [%] | Thermal conductivity (23° C.) [W/(mK)] | Thermal conductivity (10° C.) [W/(mK)] | Surface smoothness [mm] |
|---|---|---|---|---|---|---|---|---|---|---|
| Example 1 | 0.22 | 8.5 | 4.9 | 3.1 | 30.7 | 126 | 84 | 0.0179 | 0.0169 | 0.67 |
| Example 2 | 0.22 | 8.5 | 5.2 | 3.2 | 30.7 | 126 | 84 | 0.0179 | 0.0169 | 0.61 |
| Example 3 | 0.25 | 9.4 | 5.2 | 3.1 | 30.4 | 115 | 87 | 0.0177 | 0.0166 | 0.57 |
| Example 4 | 0.25 | 9.2 | 5.2 | 1.8 | 30.7 | 115 | 87 | 0.0175 | 0.0164 | 0.57 |
| Example 5 | 0.22 | 8.1 | 5.4 | 1.8 | 30.8 | 111 | 87 | 0.0173 | 0.0161 | 0.57 |
| Example 6 | 0.25 | 8.0 | 5.4 | 1.8 | 30.6 | 115 | 85 | 0.0183 | 0.0172 | 0.49 |
| Example 7 | 0.26 | 9.1 | 5.4 | 1.8 | 30.1 | 109 | 90 | 0.0179 | 0.0172 | 0.46 |
| Example 8 | 0.31 | 8.7 | 5.4 | 1.8 | 30.5 | 101 | 92 | 0.0177 | 0.0177 | 0.38 |
| Example 9 | 0.31 | 9.1 | 5.6 | 1.8 | 30.2 | 99 | 91 | 0.017 | 0.0163 | 0.35 |
| Example 10 | 0.36 | 9.3 | 5.6 | 1.8 | 30.3 | 96 | 93 | 0.0169 | 0.0168 | 0.32 |
| Example 11 | 0.36 | 9.5 | 5.9 | 1.8 | 30.4 | 95 | 93 | 0.0165 | 0.0156 | 0.30 |
| Example 12 | 0.37 | 8.6 | 6.1 | 0.9 | 30.7 | 95 | 95 | 0.0157 | 0.0147 | 0.27 |
| Example 13 | 0.22 | 8.5 | 4.7 | 3.1 | 30.4 | 132 | 84 | 0.0179 | 0.0168 | 0.72 |
| Comparative Example 1 | 0.18 | 8.4 | 4.5 | 3.1 | 30.7 | 153 | 84 | 0.0187 | 0.0175 | 0.82 |

TABLE 3

|  | Phenolic resin material | Use amount of surfactant [part] | Storage time in decompression tank [hour] | Pre-kneading of foam and phenolic resin | HLB of surfactant to be mixed with blowing agent | Srfactant to be mixed with blowing agent [parts to blowing agent] | Curing catalyst [part] | Blowing agent [part] | HCFO-1224yd(Z) ratio [mass %] | Other blowing agent 1 | Ratio of other blowing agent 1 [mass %] | Other blowing agent 2 | Ratio of other blowing agent 2 [mass %] |
|---|---|---|---|---|---|---|---|---|---|---|---|---|---|
| Example 1 | A | 2 | 0 | Pre-kneaded | — | — | 14 | 12.1 | 34 | HCFO-1233zd(E) | 62 | isobutane | 4 |
| Example 2 | A | 2 | 0 | Pre-kneaded | — | — | 14 | 12.1 | 34 | HCFO-1233zd(E) | 62 | isobutane | 4 |

TABLE 3-continued

| | Phenolic resin material | Use amount of surfactant [part] | Storage time in decompression tank [hour] | Pre-kneading of foam and phenolic resin | HLB of surfactant to be mixed with blowing agent | Srfactant to be mixed with blowing agent [parts to blowing agent] | Curing catalyst [part] | Blowing agent [part] | HCFO-1224yd(Z) ratio [mass %] | Other blowing agent 1 | Ratio of other blowing agent 1 [mass %] | Other blowing agent 2 | Ratio of other blowing agent 2 [mass %] |
|---|---|---|---|---|---|---|---|---|---|---|---|---|---|
| Example 3 | B | 2 | 0 | Pre-kneaded | — | — | 14 | 12 | 34 | HCFO-1233zd(E) | 62 | isobutane | 4 |
| Example 4 | B | 2 | 1 | Pre-kneaded | — | — | 14 | 12 | 34 | HCFO-1233zd(E) | 62 | isobutane | 4 |
| Example 5 | B | 2 | 1 | Pre-kneaded | — | — | 14 | 12.3 | 46 | HCFO-1233zd(E) | 50 | isobutane | 4 |
| Example 6 | B | 2 | 1 | Pre-kneaded | — | — | 14 | 9.3 | 46 | 2-chloropropane | 50 | isopentane | 4 |
| Example 7 | B | 2 | 1 | Pre-kneaded | — | — | 14 | 8.7 | 46 | cyclopentane | 54 | — | — |
| Example 8 | B | 2 | 1 | Pre-kneaded | 13.1 | 4 | 14 | 8.7 | 46 | cyclopentane | 54 | — | — |
| Example 9 | B | 2 | 1 | Pre-kneaded | 13.1 | 4 | 14 | 10.2 | 68 | cyclopentane | 32 | — | — |
| Example 10 | B | 2 | 1 | Pre-kneaded | 13.1 | 4 | 14 | 11 | 68 | cyclopentane | 32 | — | — |
| Example 11 | B | 2 | 1 | Pre-kneaded | 13.1 | 4 | 14 | 12.3 | 81 | cyclopentane | 19 | — | — |
| Example 12 | B | 2 | 2 | Pre-kneaded | 13.1 | 4 | 14 | 15.2 | 100 | — | — | — | — |
| Example 13 | A | 2 | 0 | Pre-kneaded | — | — | 14 | 12.1 | 22 | HCFO-1233zd(E) | 78 | — | — |
| Comparative Example 1 | A | 2 | 0 | None | — | — | 14 | 12.3 | 34 | HCFO-1233zd(E) | 62 | isobutane | 4 |

<Density of Phenolic Resin Foam>

A 200 mm square of the phenolic resin foam board was taken as a sample and then the mass and apparent volume thereof were measured in accordance with JIS K7222.

<Average Cell Diameter of Phenolic Resin Foam>

A photograph was taken at ×50 magnification with respect to a cross-section of a test specimen obtained by cutting parallel to front and rear surfaces of the phenolic resin foam at the approximate thickness direction center thereof. Four straight lines of 9 cm in length (equivalent to 1,800 μm in the actual foam cross-section) were drawn in the obtained photograph in a manner that avoided voids, a number of cells measured in accordance with the number of cells crossed by each of the straight lines was determined for each of the straight lines, and a value obtained by dividing the average value of the number of cells by 1,800 μm was taken to be an average cell diameter. Note that this method is based on a method described in JIS K6402.

<Closed Cell Ratio of Phenolic Resin Foam>

At the center position in the thickness direction of the resin foam, a 25 mm cube is cut out as a sample when the thickness of the resin foam is 25 mm or more using a cutting tool such as a band saw. Further, when the thickness of the resin foam is less than 25 mm, a rectangular solid of 25 mm in both length and width, with a thickness after removing the surface material (when a fiber material derived from the surface material remains or when there is a surface material on the back surface side) is cut out as a sample. Then, the sample volume (cm$^3$) was measured by a standard usage method of an air comparison pycnometer (Type 1,000 from Tokyo Science Co., Ltd.). The closed cell ratio of the resin foam is, as in the following formula, a value obtained by dividing the value obtained by subtracting the volume of the bubble wall (W/ρ) calculated from the sample mass W (g) and the density ρ of the resin composition constituting the resin foam from the sample volume V by the apparent volume Va (cm$^3$) calculated from the outer diameter of the sample, which was measured in accordance with the ASTM D 2856 (method C).

$$\text{Closed cell ratio (\%)} = ((V - W/\rho)/Va) \times 100$$

<Compressive Elasticity Modulus of Foam Surface Layer Portion>

A test piece with a length of 100 mm, a width of 100 mm and a thickness from the outermost layer of 10 mm was cut out from the phenolic resin foam laminate board obtained by the Examples and the Comparative Example, and a surface material was removed to obtain a test piece. The compression strength 10% was measured in accordance with JIS K 7220 with the thickness of the test piece kept to 10 mm. The compressive elasticity modulus was the maximum value of the value e obtained from the following equation in the interval from the strain of 0% to the yield point.

$$e = (b2 - b1)/\{(a2 + \Delta x) - a2\}$$

where b1: Compressive stress (MPa) at a2 b2: Compressive stress (MPa) at a2+Δx a2: Any strain (%)(smaller than the strain at the yield point)

Δx: Any strain (%) of not less than 0.0001 and not more than 0.0002

Usually, the compressive elasticity modulus is calculated for the portion of the load-deformation amount curve where the linear relationship is clear. However, in the phenolic foam, the force-deformation curve may not have a clear straight line portion (the curve changes gently from downward convex to upward convex), so the maximum slope in the minute section before the yield point was determined as the compressive elasticity modulus.

<Compressive Elasticity Modulus of Foam>

A test piece with a length of 10 mm and a width of 100 mm was cut out from the phenolic resin foam laminate board obtained by the Examples and Comparative Example, and a surface material was removed to obtain a test piece.

10% compression strength was measured in accordance with JIS K 7220 without changing the thickness of the test piece. The compressive elasticity modulus was the maximum value of the value obtained from the following equation, as with the above-mentioned equation in the section from the strain of 0% to the yield point.

$$e=(b2-b1)/\{(a2+\Delta x)-a2\}$$

where
b1: Compressive stress (MPa) at a2
b2: Compressive stress (MPa) at a2+Δx
a2: Any strain (%) (smaller than the strain at the yield point)
Δx: Any strain (%) of not less than 0.0001 and not more than 0.0002

The measurement result of the compressive elasticity modulus of the surface layer portion is usually lower than that of the overall thickness sample. Note that, when the surface layer portion is cut out, one side of the sample does not have a skin layer, so the two are evaluated on different assumptions.

<Identification of Types of Blowing Agent in Phenolic Resin Foam and Composition Ratio>

First, standard gases of chlorinated hydrofluoroolefin, non-chlorinated hydrofluoroolefin, halogenated hydrocarbon, and hydrocarbon are used to determine the retention time under the following GC/MS measurement conditions.

The surface material was peeled off from the phenolic resin foam laminate board obtained by the Examples and Comparative Example, and 100 mg of a sample was cut out from the phenolic resin foam with a utility knife. The sample was placed in a Tedlar bag, degassed with a pump, and then crushed by hand. Further, the sample was placed in a temperature controller whose temperature was adjusted to 81° C. for 10 minutes while being placed in the Tedlar bag. 100 μL of the gas generated in the Tedlar bag was taken and GC/MS analysis was performed under the measurement conditions shown below to identify the types of blowing agent in the phenolic resin foam.

The presence of hydrofluoroolefins, halogenated hydrocarbons, and hydrocarbons was confirmed by the analysis results of GC/MS. Types of hydrofluoroolefins, halogenated hydrocarbons, and hydrocarbon were identified by the predetermined retention times and mass spectra. Separately, the detection sensitivity of each generated gas component was measured by each standard gas, and the composition ratio was calculated from the detection area and the detection sensitivity of each gas component obtained by GC/MS. The mass ratio of each gas component was calculated from the composition ratio and the molar mass of each identified gas component.

(GC/MS Measurement Conditions)
Gas chromatography: "Agilent 7890" from Agilent Technology Inc.
Column: DB-5MS (0.25 mmφ×30 m, Film thickness 1 μm)
Carrier gas: Helium
Flow rate: 1 ml/min.
Inlet temperature: 150° C.
Injection method: Split method (1/10)
Injection method of sample: Solution 1 μL (for a gas sample, 100 μl is injected using a gas tight syringe)
Column temperature: After 40° C. (5 min.), temperature is increased up to 150° C. at 50° C./min, and is kept for 4.8 min.
Mass analysis: "Q1000GC" from JEOL Ltd.
Ionization method: Electron ionization (70 eV)
Scan range: m/Z=10 to 500
Voltage: −1300V
Ion source temperature: 230° C.
Interface temperature: 150° C.

<Cell Internal Pressure of Blowing Agent Component>

Similar to the measurement of the density of the phenolic resin foam, a 20 cm square phenolic resin foam board was used as a sample, and the density obtained by measuring the mass and the apparent volume according to JIS K7222 was defined as I (g/m³). The density of the phenolic resin was defined as $1.27 \times 10^6$ (g/m³), and the ratio J of the bubble volume to the sample volume and the bubble volume K (m³/g) per unit mass of the sample were determined.

$$J=1-\{I/1.27\times10^6\}$$

$$K=I^{-1}\times J \text{ (m}^3\text{/g)}$$

Next, about 0.25 g was cut out from the vicinity of the center of the sample with a utility knife. A homogenizer (ULTRA-TURRAX® tube drive, IKA Japan Co., Ltd.) was used to extract the blowing agent in the sample. The cut sample was placed in a sealed container attached to the device, 10 mL of chloroform and 12 glass balls for crushing were further placed, and the sample was covered and sealed. The sample was crushed for 3 minutes at a rotation speed of 6000 rpm to extract a blowing agent. The extract was filtered through a polytetrafluoroethylene disc filter having a bore size of 0.45 μm, and GC/MS measurement was performed under the same conditions as above.

Then, for the blowing agent component detected from the analysis result of GC/MS, a calibration curve of the area value with respect to the solution concentration of each component was prepared. For the blowing agent that is liquid at room temperature, samples diluted with chloroform to various concentrations were prepared. For the blowing agent which is a gas at room temperature, samples diluted to various concentrations with nitrogen gas were prepared in a polyvinyl fluoride sampling bag (Tedlar® bag). Thereafter, GC/MS measurement was performed under the same conditions as above.

From each mass of the blowing agent component obtained from the relationship with the calibration curve, the amount of substance of each blowing agent component per unit mass of the sample was determined. The value was obtained with the total amount of substance of each blowing agent component per unit mass of sample as M (mol/g), the bubble internal pressure of the blowing agent component as P (atm), and the standard atmospheric pressure as 101325 (Pa), then by substituting the previous bubble volume K into the following equation.

$$P=[(M\times8.314\times273.15)/K]/101325 \text{ (atm)}$$

<Amount of Air Contained in Phenolic Resin Foam>

Procedure 1: At the center position in the thickness direction of the phenolic resin foam laminate board, a 20 mm cube was cut out as a sample when the thickness of the resin foam is 20 mm or more using a utility knife. Further, when the thickness of the resin foam is less than 20 mm, a rectangular solid of 20 mm in both length and width, with a thickness after removing the surface material (when a fiber material derived from the surface material remains or when there is a surface material on the back surface side) was cut out as a sample. Then the volume A (unit: L) of the cut-out sample was measured.

Procedure 2: The cut-out foam and crusher, 6 glass balls for crushing, a glove bag, an oxygen concentration meter, and a utility knife were placed in the front chamber of the glove box.

Procedure 3: The front chamber of the glove box was evacuated to obtain the oxygen concentration of 0.0%. The contents of the front chamber were transferred to the glove box body.

Procedure 4: Using the utility knife in the glove box, the sample was cut into 4 equal parts by cutting the sample into a cross in the thickness direction of this sample.

Procedure 5: All of the samples cut into 4 parts and 6 glass balls were placed in an airtight container and the container was covered.

Procedure 6: The airtight container was attached to the crusher, and the test piece was crushed under the conditions of 6000 rpm and 15 minutes.

Procedure 7: The airtight container was removed and placed in the glove bag, then the glove bag was closed.

Procedure 8: While measuring with an air pump installed in the glove box, 30 L of nitrogen gas in the glove box was fed to the glove bag.

Procedure 9: The airtight container was opened in the glove bag and allowed to stand such that the entire glove bag was filled with the gas in the airtight container.

Procedure 10: An oxygen meter was connected to the glove bag, and the blank oxygen concentration at this time was recorded as B0.

Procedure 11: Subsequently, suction was performed at 0.5 L/min for 2 minutes with an air pump, and a stable oxygen concentration B (ppm) was recorded.

Procedure 12: The amount of oxygen C in 30 L was calculated by the following equation.

$$C=30\times(B-B0) \text{ (unit: L)}$$

Procedure 13: The oxygen concentration D in the phenolic resin foam was determined from the following equation.

$$D=C/A \text{ (unit: vol \%)}$$

A: Sample volume
C: Amount of oxygen in 30 L of gas in the glove bag
D: Oxygen concentration in the phenolic resin foam Calculation was made with the oxygen concentration in the air as 20.95% and the air concentration in the phenolic foam as 4.77 times the oxygen concentration.

As a crusher, a disposable tube type dry mill from IKA Japan Co., Ltd was used.

<Thermal Conductivity of Phenolic Resin Foam Laminate Board>

The thermal conductivity at 10° C. was measured in accordance with JIS A 1412-2: 1999. Specifically, a phenolic resin foam laminate board sample was cut into 600 mm squares, a specimen was placed in an atmosphere of 23±1° C. and humidity of 50±2%, and the change in mass over time was measured every 24 hours. The state was adjusted until the mass change over 24 hours was 0.2 mass % or less. The state-adjusted specimen was introduced into a thermal conductivity device placed in an atmosphere of 23±1° C. and humidity of 50±2%.

One test piece and symmetrical configuration measuring device ("HC-074/600" from EKO Instruments Inc.) were used to measure the thermal conductivity at 10° C. under the condition of low temperature board 0° C. and high temperature board 20° C. and the thermal conductivity at 23° C. under the condition of low temperature board 13° C. and high temperature board 33° C.

<Surface Smoothness>

A phenolic resin foam laminate board of any thickness cut into a width of 65 cm and a length of 65 cm was placed on a flat surface board, and a surface of 50 cm square in the center was used as a measurement target. Within this range, measurements were taken over 50 cm at a scanning speed of 1.0 cm/s in the length direction using a laser displacement meter. The difference between the maximum value and the minimum value of the heights of the obtained 50 points was calculated. Further, the measurement was performed by changing the position twice, and the average value of the difference between the maximum value and the minimum value of three times was taken as the surface smoothness of one side. Subsequently, the surface material was turned over and the surface smoothness of the other side was determined in the same manner. The larger one of the surface smoothness on both sides was defined as the surface smoothness of the phenolic resin foam laminate board.

The length direction is a direction in which the surfaces (weld lines) at which the foamable resin compositions ejected in a band shape are joined to each other are continuous. The direction in which the depressed streaks visible on the surface from which the surface material is peeled off can be regarded as the length direction. Alternatively, when looking at the cut surface, a direction in which a dark-colored portion exists near the middle layer and the portion continues over the opposite surface can be regarded as the length direction. The width direction is a direction orthogonal to the length direction.

Example 2

The phenolic resin foam laminate board was produced in the same manner as in Example 1, except that, in the post-curing step, the laminate board was heated in a 140° C. oven for 10 minutes before curing in a 110° C. oven for 3 hours, and was evaluated.

Example 3

The phenolic resin foam laminate board was produced in the same manner as in Example 2, except that, the phenolic resin A was changed to the phenolic resin B, and the blowing agent added to the phenolic resin was 12 parts by mass, and was evaluated.

Example 4

The phenolic resin foam laminate board was produced in the same manner as in Example 3, except that the blowing agent was added after storing the phenolic resin composition obtained by mixing a surfactant in a tank whose pressure was reduced to 30 kPa for one hour, and was evaluated.

Example 5

The phenolic resin foam laminate board was produced in the same manner as in Example 4, except that the blowing agent added to the phenolic resin was 12.3 parts by mass of a mixture of 46 mass % HCFO-1224yd(Z), 50 mass % HCFO-1233zd(E) and 4 mass % isobutane, and was evaluated.

Example 6

The phenolic resin foam laminate board was produced in the same manner as in Example 5, except that the blowing agent added to the phenolic resin was 9.3 parts by mass of a mixture of 46 mass % HCFO-1224yd(Z), 50 mass % 2-chloropropane and 4 mass % isopentane, and was evaluated.

Example 7

The phenolic resin foam laminate board was produced in the same manner as in Example 5, except that the blowing agent added to the phenolic resin was 8.7 parts by mass of a mixture of 46 mass % HCFO-1224yd(Z)46 and 54 mass % cyclopentane, and was evaluated.

Example 8

A phenolic resin composition was obtained by mixing ethylene oxide-propylene oxide block copolymer Pluronic® F-127 as a surfactant in a proportion of 2.0 parts by mass per 100 parts by mass of the phenolic resin B. The phenolic resin composition was stored in a tank whose pressure was reduced to 20 kPa for one hour.

To 8.7 parts by mass of a mixture of 46 mass % HCFO-1224yd(Z) and 54 mass % cyclopentane, surfactant polyoxyethylene nonylphenyl ether (HLB 13.1) was added at a ratio of 4 parts by mass per 100 parts by mass of blowing agent, the obtained mixture was added to the phenolic resin composition while being mixed using a static mixer. At the same time, the first stage stirring was performed under the environment of 7 bar and 40° C. Then, the solution was fed while keeping at 7 bar or higher, and is fed to a rotation number variable mixing head whose temperature was controlled at 15° C. The phenolic resin foam laminate board was produced in the same manner as in Example 2, except above, and was evaluated.

Example 9

The phenolic resin foam laminate board was produced in the same manner as in Example 8, except that the blowing agent added to the phenolic resin was 10.2 parts by mass of a mixture of 68 mass % HCFO-1224yd(Z)68 and 32 mass % cyclopentane, and was evaluated.

Example 10

The phenolic resin foam laminate board was produced in the same manner as in Example 9, except that the blowing agent added to the phenolic resin was 11 parts by mass, the temperature of the pre-molding step was 69° C., the residence time was 12 minutes, and the temperature of the main-molding step was 74° C., and was evaluated.

Example 11

The phenolic resin foam laminate board was produced in the same manner as in Example 10, except that the blowing agent added to the phenolic resin was 12.3 parts by mass of a mixture of 81 mass % HCFO-1224yd(Z) and 19 mass % cyclopentane, and was evaluated.

Example 12

The phenolic resin foam laminate board was produced in the same manner as in Example 10, except that: the time of storing in the tank whose pressure was reduced to 30 kPa was changed to 2 hours; the blowing agent added to the phenolic resin was 15.2 parts by mass of HCFO-1224yd(Z); the temperature of the pre-molding step was 62° C.; the residence time was 12 minutes; and the temperature of the main-molding step was 70° C., and was evaluated.

Example 13

The phenolic resin foam laminate board was produced in the same manner as in Example 1, except that the blowing agent added to the phenolic resin was 12.1 parts by mass of a mixture of 22 mass % HCFO-1224yd(Z) and 78 mass % HCFO-1233zd(E), and was evaluated.

Comparative Example 1

In Example 1, the mixing of the blowing agent at two stages of temperature was stopped, and the mixture was fed to the mixing head at the same time as the curing catalyst. In other words, a phenolic resin composition was obtained by mixing ethylene oxide-propylene oxide block copolymer Pluronic® F-127 as a surfactant in a proportion of 2.0 parts by mass per 100 parts by mass of the phenolic resin A. To the 100 parts by mass of phenolic resin composition, 12.3 parts by mass of a mixture of 34 mass % HCFO-1224yd(Z), 62 mass % HCFO-1233zd(E), and 4 mass % isobutane was added as a blowing agent, and further 14 parts by mass of a composition constituted by a mixture of 80 mass % xylene sulfonic acid and 20 mass % diethylene glycol was added as a curing catalyst, and they were fed to a rotation speed variable mixing head whose temperature was controlled to 15° C. Further, a phenolic resin foam laminate board was produced in the same manner as in Example 1, except that the temperature of the pre-molding step was changed to 63° C. and the residence time was changed to 3 minutes, and was evaluated.

INDUSTRIAL APPLICABILITY

According to the present invention, a phenolic resin foam laminate board that suppresses wrinkles on the surface material and has both surface smoothness and a high thermal conductivity is available.

REFERENCE SIGNS LIST

1 Phenolic resin foam (core material)
2 Flexible surface material
10 Phenolic resin foam laminate board

The invention claimed is:

1. A phenolic resin foam laminate board in which a surface material is arranged on at least one of one side of a phenolic resin foam and a back side of the one side, wherein:
   the phenolic resin foam has a density of not less than 22 kg/m3 and not more than 50 kg/m3, a cell diameter of not less than 50 μm and not more than 170 μm, and a closed cell ratio of not less than 80%;
   when HCFO-1224yd(Z), aliphatic hydrocarbons having a carbon number of 6 or less, chlorinated saturated hydrocarbons having a carbon number of 5 or less, and hydrofluoroolefin are gas components, only HCFO-1224yd (Z) is contained as the gas component; and
   a cell internal pressure of air bubble is 0.20 atm or more.

2. The phenolic resin foam laminate board according to claim 1, wherein the cell internal pressure is 0.26 atm or more.

3. The phenolic resin foam laminate board according to claim 1, wherein a compressive elasticity modulus of a surface layer portion is 4.9 MPa or more.

4. The phenolic resin foam laminate board according to claim 1, wherein the phenolic resin foam contains 3.0 vol % or less of air.

5. The phenolic resin foam laminate board according to claim 1, wherein thermal conductivity at 23° C. is 0.0180 W/(m·K) or less.

6. The phenolic resin foam laminate board according to claim 1, wherein thermal conductivity at 23° C. is 0.0159 W/(m·K) or less.

7. The phenolic resin foam laminate board according to claim 1, wherein thermal conductivity at 10° C. is 0.0164 W/(m·K) or less.

8. A composite board made by laminating the phenolic resin foam laminate board according to claim 1 and an external member.

9. A phenolic resin foam laminate board in which a surface material is arranged on at least one of one side of a phenolic resin foam and a back side of the one side, wherein:
the phenolic resin foam has a density of not less than 22 kg/m3 and not more than 50 kg/m3, a cell diameter of not less than 50 μm and not more than 170 μm, and a closed cell ratio of not less than 80% and contains at least one gas component selected from HCFO-1224yd (Z), aliphatic hydrocarbons having a carbon number of 6 or less, chlorinated saturated hydrocarbons having a carbon number of 5 or less, and hydrofluoroolefin;
20 mass % or more is HCFO-1224yd(Z) with respect to a total amount of the gas component; and
a cell internal pressure of air bubble is 0.20 atm or more.

10. The phenolic resin foam laminate board according to claim 9, wherein the cell internal pressure is 0.26 atm or more.

11. The phenolic resin foam laminate board according to claim 9, wherein a compressive elasticity modulus of a surface layer portion is 4.9 MPa or more.

12. The phenolic resin foam laminate board according to claim 9, wherein the phenolic resin foam contains 3.0 vol % or less of air.

13. The phenolic resin foam laminate board according to claim 9, wherein thermal conductivity at 23° C. is 0.0180 W/(m·K) or less.

14. The phenolic resin foam laminate board according to claim 9, wherein thermal conductivity at 23° C. is 0.0159 W/(m·K) or less.

15. The phenolic resin foam laminate board according to claim 9, wherein thermal conductivity at 10° C. is 0.0164 W/(m·K) or less.

16. A composite board made by laminating the phenolic resin foam laminate board according to claim 9 and an external member.

* * * * *